United States Patent
Takahashi

(10) Patent No.: US 7,722,798 B2
(45) Date of Patent: May 25, 2010

(54) METHOD OF MANUFACTURING POROUS BODY

(75) Inventor: Kaori Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 601 days.

(21) Appl. No.: 11/516,559

(22) Filed: Sep. 7, 2006

(65) Prior Publication Data

US 2007/0063398 A1 Mar. 22, 2007

(30) Foreign Application Priority Data

Sep. 16, 2005 (JP) ............................. 2005-270219

(51) Int. Cl.
*B28B 3/20* (2006.01)
(52) U.S. Cl. .................................... 264/630
(58) Field of Classification Search ................. 264/630
See application file for complete search history.

(56) References Cited

U.S. PATENT DOCUMENTS 7,071,135 B2 * 7/2006 Ogunwumi et al. ......... 501/134

2006/0064957 A1 * 3/2006 Ogunwumi et al. ........... 55/523
2007/0063397 A1 * 3/2007 Inoue ......................... 264/628

FOREIGN PATENT DOCUMENTS

JP 03-008757 1/1991

\* cited by examiner

*Primary Examiner*—Steven P Griffin
*Assistant Examiner*—Russell J Kemmerle, III
(74) *Attorney, Agent, or Firm*—Burr & Brown

(57) ABSTRACT

A method of manufacturing a porous body is provided, including a step of firing a formed honeycomb body including an aluminum source material and a titanium source material to obtain a fired porous honeycomb body containing aluminum titanate as a main component. In this method, 50 mass % or more of particles having particle diameters in a range of 10 to 20 μm are used as the aluminum source material, and the amount of the aluminum source material is such that the amount of an aluminum component in the fired honeycomb body is 48 mass % or more in terms of $Al_2O_3$.

17 Claims, 2 Drawing Sheets

METHOD OF MANUFACTURING POROUS BODY

BACKGROUND OF THE INVENTION

1. Field of the Invention

The present invention relates to a method of manufacturing a porous body which contains aluminum titanate as a main component.

2. Description of the Related Art

Since aluminum titanate has a low thermal expansion, excellent thermal shock resistance and a high melting point, it is used as a porous material for a catalyst carrier for the treatment of an exhaust gas of an automobile, a diesel particulate filter or the like. Therefore, various materials containing aluminum titanate have been developed.

For example, there is proposed an aluminum titanate and mullite based material having a predetermined chemical composition for the purpose of improving thermal cycle durability in the case where an aluminum titanate based material is used as a honeycomb porous catalyst carrier for a catalytic converter (see Patent Document 1 Japanese Patent Application Laid-Open No. 3-8757).

SUMMARY OF THE INVENTION

The present invention provides a method of manufacturing a porous body, which is capable of forming more satisfactory pores having a high permeability to a fluid to be treated in a case where a porous body containing aluminum titanate as a main component is manufactured as a porous body for use in a catalyst carrier, a filter or the like. For example, when the porous body is used as a filter, pressure losses can be reduced.

According to a first aspect of the present invention, a method of manufacturing a porous body, comprising a step of firing a formed body including an aluminum source material and a titanium source material to obtain a fired porous body containing aluminum titanate as a main component. 50 mass % or more of particles having particle diameters in a range of 10 to 20 pin are used as the aluminum source material, and an amount of the aluminum source material in the formed body is set so that an amount of an aluminum component in the fired body is 48 mass % or more in terms of $Al_2O_3$.

According to a second aspect of the present invention, the method of manufacturing the porous body according to the first aspect is provided, wherein aluminum oxide particles are used as the aluminum source material.

According to a third aspect of the present invention, the method of manufacturing the porous body according to the first or second aspects is provided, wherein particles having an average particle diameter of 0.5 to 10 μm are used as the titanium source material.

According to a fourth aspect of the present invention, the method of manufacturing the porous body according to any one of the above first to third aspects is provided, wherein the formed body further includes a fired silicon source material, and an aluminum titanate and mullite based article is obtained by the firing.

According to a fifth aspect of the present invention, the method of manufacturing the porous body according to any one of the above first to fourth aspects is provided, wherein titanium oxide particles are used as the titanium source material.

According to a sixth aspect of the present invention, the method of manufacturing the porous body according to any one of the above first to fifth aspects is provided, wherein the porous body is a honeycomb structure.

In the method of manufacturing the porous body of the present invention, the particles including 50 mass % or more of particles having particle diameters of 10 to 20 μm are used as the aluminum source material, and the aluminum source material is used in such an amount that the amount of the aluminum component in the fired body is 48 mass % or more in terms of $Al_2O_3$. Therefore, it is possible to manufacture the porous body having reduced pressure losses in a case where the porous body is used in a filter, for example.

DETAILED DESCRIPTION OF THE INVENTION

A method of manufacturing a porous body of the present invention will be described hereinafter in detail in accordance with an embodiment, but the present invention is not limited to these embodiments.

Figure 1A:
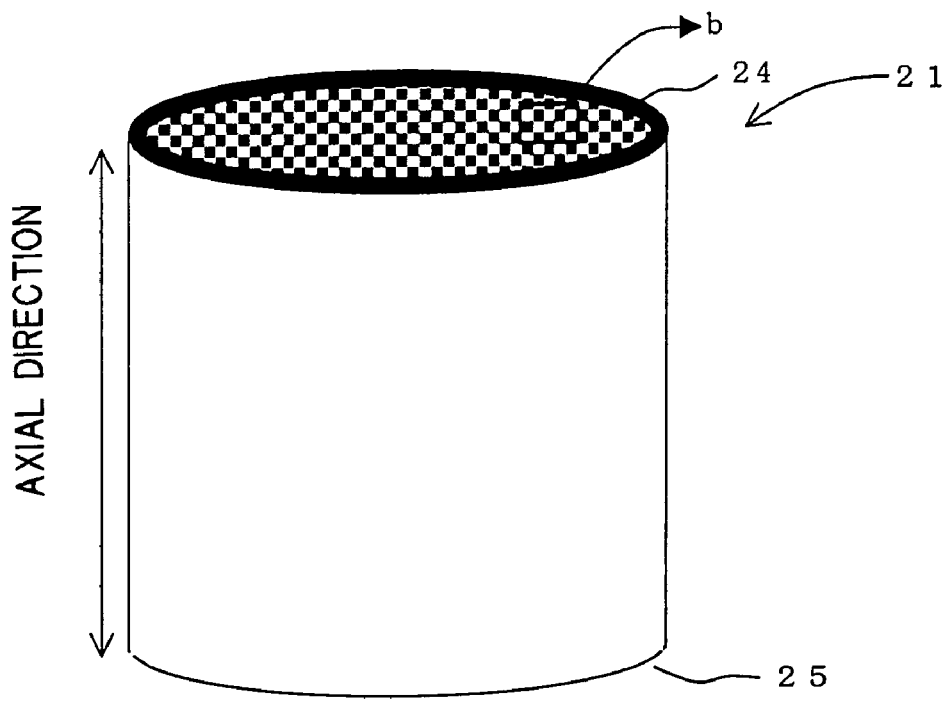
FIG. 1(a) is a schematic perspective view showing one embodiment of a porous body of the present invention.
Figure 1B:
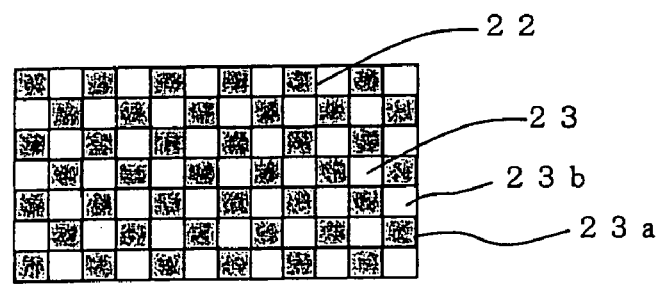
FIG. 1(b) is a partially enlarged view of part b of FIG. 1(a).

FIG. 1(a) is a schematic perspective view showing a configuration of a honeycomb structure 21 as one example of a porous body manufactured by the present invention, and FIG. 1(b) is a partially enlarged view of part b of FIG. 1(a). The honeycomb structure 21 shown in FIGS. 1(a) and 1(b) includes porous partition walls 22, and cells 23 extending from an end face 24 to an end face 25 are formed by the partition walls 22. In the case where the honeycomb structure 21 is used in a filter such as a diesel particulate filter, in general, the configuration is constituted in which openings of predetermined cells 23a and 23b are plugged in either of the end face 24 and the end face 25. In this case, it is preferable that the adjacent cells 23a and 23b are alternately plugged at one-side end portion so that the end face 24 and the end face 25 exhibit a checkered pattern. It is to be noted that there is a case where the plugging is not necessary as in a case where the honeycomb structure of the present invention is used in a catalyst carrier. An embodiment of a method of manufacturing the porous body of the present invention will be described in accordance with an example in which the honeycomb structure shown in FIGS. 1(a) and 1(b) is manufactured.

It is to be noted that in the present specification, the term "particle diameter" means a particle diameter measured by a laser diffraction/scattering type particle size distribution measuring device (e.g., trade name: LA-920 or the like manufactured by HORIBA, Ltd.). Moreover, the term "average particle diameter" means a particle diameter ($D_{50}$) at a point where an accumulated mass of particles is 50% of the total measured mass in a particle diameter distribution measured. For example, the particle diameter can be measured by a method of dispersing 1 g of particulate matter as a measurement object in 50 g of ion-exchange water by ultrasonic dispersion in a glass beaker, and diluting the resulting suspension at an appropriate concentration to inject the suspension into cells of the measuring device. Furthermore, after the ultrasonic dispersion is performed in the measuring device for two minutes, the particle diameter is measured.

Formed Body

The formed body can be obtained by forming a forming material including an aluminum source material and a titanium source material after dispersing the material in a dispersion medium, and mixing and kneading the material. For example, in a case where the honeycomb structure is manufactured, it is possible to mold a non-plugged formed body having a shape shown in FIGS. 1(a) and 1(b) by extrusion forming or the like.

Aluminum Source Material

The aluminum source material is particles including 50 mass % or more, preferably 70 mass % or more of particles having particle diameters of 10 to 20 µm with respect to the total aluminum source material. Heretofore, in a case where the aluminum source material and the titanium source material are fired to manufacture aluminum titanate, it has been generally known to use an aluminum source material having small particle diameters. In the present invention, however, the aluminum source material includes 50 mass % or more, preferably 70 mass % or more of particles having comparatively large particle diameters of 10 to 20 µm. An average particle diameter of the aluminum source material is preferably 10 to 18 µm, further preferably 11 to 16 µm. As the aluminum source material, aluminum oxide ($Al_2O_3$, hereinafter sometimes referred to as "alumina") is preferable. Most preferably, α-alumina is preferred, and raw soda α-alumina is also especially preferable. As the aluminum source material having the above-described particle diameter distribution, electromelting alumina usually for use in abrasive grains is preferable from a viewpoint of availability.

When such an aluminum source material is used, fluid permeability, for example, gas permeability of the porous body obtained through a firing step described later, is enhanced, and it is possible to reduce pressure losses in a case where the fluid to be treated passes through the porous body. This is because during the firing step, particles of this aluminum source material function as aggregates, and aluminum titanate is formed as the titanium source material is mixed into the aluminum source material particles. Accordingly, while maintaining to a certain degree shapes of the aluminum source material particles which are comparatively large and which have little fluctuation in size, aluminum titanate is generated. As a result, pores having a satisfactory communicating property and a comparatively small pore diameter distribution are formed to enhance the fluid permeability, and the pressure losses are reduced.

The amount of an aluminum component in a fired body needs to be 48 mass %, preferably 55 to 55 mass % in terms of $Al_2O_3$. If the amount of aluminum component in the fired body is excessively small, the fired body runs short of aluminum titanate crystals, and a desired thermal shock resistance cannot be obtained in some case.

Titanium Source Material

There is not any special restriction on the titanium source material, but titanium oxide ($TiO_2$) is preferred from the view point of availability and with respect to ease of forming aluminum titanate. As to titanium oxide, a rutile type, an anatase type, a brookite type, or any of these types may be used, but the rutile type titanium oxide is preferable. The titanium source material has an average particle diameter of preferably 0.5 to 10 µm, more preferably 0.5 to 5 µm. When the titanium source material having such a particle diameter is used, aluminum titanate is easily formed through the above-described process, and pressure losses can further be reduced. As the titanium source having the above-described particle diameter distribution, from the viewpoint of the availability, titanium oxide is preferable which is usually used in a pigment or the like and which is manufactured by a sulfate process or a chlorine process.

The amount of titanium in the fired body is preferably 10 to 50 mass %, further preferably 30 to 45 mass % in terms of $TiO_2$. If the amount of titanium in the fired body is excessively small, the fired body runs short of aluminum titanate crystals, and the desired thermal shock resistance cannot be obtained in some case. If the amount is excessively large, titanium oxide remains in the fired body, and the desired thermal shock resistance cannot be obtained in some case.

Silicon Source Material

In addition to the above-described alumina and titanium source material, the forming material preferably includes a silicon source material. When the forming material includes the silicon source material, in the firing step described later, an aluminum titanate and mullite based ceramic is generated, and the strength of the porous body is enhanced.

Examples of the silicon source material include silica glass, kaoline, mullite and quartz. The silicon source material is particles having an average particle diameter of preferably 1 to 100 µm, more preferably 20 to 50 µm. The amount of the silicon source material to be added to the forming material is such that the amount of silicon in the resultant fired body is preferably 20 mass % or less, more preferably 3 to 10 mass % in terms of $SiO_2$.

In a case where the above-described raw material is used, another inorganic component is sometimes included. In such a case, it is preferable to appropriately select raw materials so that an MgO component in the fired body is 0.8 mass % or less, the total of CaO, $Na_2O$ and $K_2O$ components is 0.3 mass % or less, and an $Fe_2O_3$ component is 5 mass % or less. If the amount of the $Fe_2O_3$ component is excessively large, a thermal expansion coefficient tends to increase. If the amount of MgO component is excessively large, a hetero-phase such as $MgAl_2O_4$ having a large thermal expansion coefficient tends to be easily formed. If the total amount of the CaO, $Na_2O$ and $K_2O$ components is excessively large, a glass phase enlarges, and a dimensional change due to a thermal cycle tends to increase. Especially in a case where the fired body of the aluminum titanate and mullite based ceramic is formed by firing, if the amounts of the MgO component and an alkali component are excessively large, the glass phase in a mullite phase enlarges, and the dimensional change due to the thermal cycle tends to increase. It is to be noted that from the viewpoint of enhancing the stability of aluminum titanate, it is preferred that the fired body contains a small amount of the $Fe_2O_3$ component, the MgO component, the CaO component and the like, and it is also preferable to adjust the raw material so as to contain at least one of these components within the above-described amount range.

Organic Auxiliary Agent Component

It is preferable that the forming material includes a pore former, a binder, a dispersant or the like as an organic auxiliary agent component. Examples of the pore former include graphite, foamed resin, water-absorbing resin, flour, starch, phenol resin, polymethyl methacrylate, polyethylene and polyethylene terephthalate. It is most preferable to contain the foamed resin. As the foamed resin, it is possible to use either a resin which is heated to foam or a resin already heated and foamed. From the viewpoint of enhancing the performance of the porous body, the resin which is heated to foam is preferable because many open pores can be formed. In this case, a resin which is heated to foam at 100° C. or more is further preferable in that it is possible to suppress deformation of the porous body while making many open pores. From the viewpoint of inhibiting breakage of the porous body during firing, especially breakage (so-called cell cut) of cell walls in a case where the porous body is a honeycomb structure, it is preferable to use the resin that is already heated and foamed.

Examples of the binder include hydroxypropyl methylcellulose, methylcellulose, hydroxyethyl cellulose, carboxylmethylcellulose and polyvinyl alcohol. Examples of the dispersant include ethylene glycol, dextrin, fatty acid soap and polyalcohol.

Dispersion Medium

Examples of the dispersion medium in which the above-described components are dispersed include water and wax. Above all, water is preferable because a volume change is small during drying, little gas is generated, and the water is thus easy to handle.

The forming material is dispersed in the dispersion medium, mixed and kneaded to form clay, and the clay is formed. Examples of a device for forming the clay include a combination of a kneader and an extruder and a continuous kneading extruder.

The blend ratio of the components in the formed clay, for example, with respect to 100 parts by mass of the aluminum source material, the titanium source material, optionally the silicon source material and the other inorganic component in total, can be set to 5 to 40 parts by mass of pore former and 10 to 40 parts by mass of dispersion medium (e.g., water), and, if necessary, 3 to 5 parts by mass of binder or 0.5 to 2 parts by mass of dispersant.

The clay obtained as described above is formed into a predetermined shape. Examples of a method of forming the clay into a formed honeycomb body include a method of extrusion-forming the clay through a die having slits for forming partition walls having an appropriate partition wall thickness and cell pitch.

Firing Step

The firing step is a step of firing the formed body obtained in a forming step to obtain the porous body containing aluminum titanate as a main component.

It is preferable to dry the formed body before the resultant formed body is fired. Examples of a method of drying the formed body include hot-air drying, microwave drying, dielectric drying, reduced-pressure drying, vacuum drying and freeze drying.

Examples of a method of firing the formed body include a method of firing the body by use of a device such as an electric furnace on conditions that the maximum firing temperature is 1500 to 1700° C., a time for retaining the maximum firing temperature is 0.5 to ten hours, and a firing atmosphere is the atmosphere.

As shown in FIGS. 1(*a*) and 1(*b*), to obtain a honeycomb structure in which predetermined cells are plugged, after forming a formed honeycomb body, a plugging step of plugging the predetermined cells is required. The plugging step can be performed by: adding the dispersion medium, the binder or the like to a predetermined material such as an aluminum titanate powder to obtain a slurry state; disposing this material so as to close openings of the predetermined cells; and drying and/or firing the material. In the plugging step, the end face of each predetermined cell is plugged so as to form a checkered pattern. The step is preferably performed so that end portions of adjacent cells are alternately plugged on each side. The plugging step may be performed in any stage after the forming step. If the plugging requires firing, the plugging is preferably performed prior to the firing step, because the firing may be performed once.

The fired body obtained as described above may be used as the porous body as it is, but the resultant fired body may be processed into the porous body. For example, in a case where the honeycomb structure is obtained, an outer peripheral portion of the resultant fired honeycomb body is ground, and the ground portion may be coated with a coating material. Examples of the coating material include a material obtained by adding the dispersion medium, the binder or the like to the aluminum titanate powder to obtain the slurry state. Alternatively, sides of a plurality of fired honeycomb bodies may be bonded to one another to obtain the honeycomb structure, the outer peripheral portion of the structure is ground, and the ground portion may be coated with the above-described coating material.

EXAMPLES

The present invention will be described hereinafter in more detail in accordance with examples, but the present invention is not limited to these examples.

Example 1

As an aluminum source material, alumina ($Al_2O_3$) particles containing 70 mass % of particles having particle diameters of 10 to 20 μm were used. As a titanium source material, titanium oxide ($TiO_2$) particles having an average particle diameter of 4 μm were used. As a silicon source material, silica ($SiO_2$) particles having an average particle diameter of 10 μm were used. The particles were blended so that the amounts of an aluminum component, a titanium component and a silicon component in a fired body were 54.2 mass %, 42.5 mass % and 3.3 mass % in terms of $Al_2O_3$, $TiO_2$ and $SiO_2$, respectively. Furthermore, with respect to 100 parts by mass of the alumina particles, the titanium oxide particles and the silica particles in total, 13 parts by mass a foamed resin as a pore former, 8 parts by mass of methylcellulose as a binder and 0.5 part by mass of potassium laurate as a surfactant were added to form a forming material. Furthermore, after adding 25 parts by mass of water as a dispersion medium, the material was kneaded with a kneader to prepare clay. The clay was extruded and formed into a formed honeycomb body. The resultant formed honeycomb body was fired in the atmosphere in a firing step including a calcining (degreasing) step of removing the binder to obtain a fired honeycomb body (honeycomb structure). The maximum firing temperature was set to 1500° C., and a time for retaining the maximum temperature was set to six hours.

Example 2

A fired honeycomb body was obtained in the same manner as in Example 1 except that alumina particles, titanium oxide particles and silica particles were blended so that amounts of an aluminum component, a titanium component and a silicon component in the fired body indicated ratios shown in Table 1 in terms of $Al_2O_3$, $TiO_2$ and $SiO_2$, respectively.

Example 3

A fired honeycomb body was obtained in the same manner as in Example 1 except that alumina containing 50 mass % of particles having particle diameters of 10 to 20 μm was used as an aluminum source material, and alumina particles, titanium oxide particles and silica particles were blended so that amounts of an aluminum component, a titanium component and a silicon component indicated ratios shown in Table 1 in terms of $Al_2O_3$, $TiO_2$ and $SiO_2$, respectively.

Example 4

A fired honeycomb body was obtained in the same manner as in Example 1 except that mullite particles having an average particle diameter of 5 μm were used as a silicon source material, and alumina particles, titanium oxide particles and mullite particles were blended so that amounts of an aluminum component, a titanium component and a silicon component indicated ratios shown in Table 1 in terms of $Al_2O_3$, $TiO_2$ and $SiO_2$, respectively.

Comparative Example 1

A fired honeycomb body (a porous body in which an aluminum component in the fired body is less than 48 mass % in terms of $Al_2O_3$) was obtained in the same manner as in Example 1 except that alumina containing 50 mass % of particles having particle diameters of 10 to 20 μm was used as an aluminum source material, and alumina particles, titanium oxide particles and silica particles were blended so that amounts of an aluminum component, a titanium component and a silicon component indicated ratios shown in Table 1 in terms of $Al_2O_3$, $TiO_2$ and $SiO_2$, respectively.

Comparative Example 2

A fired honeycomb body (a porous body manufactured using alumina particles containing less than 50 mass % of particles having particle diameters of 10 to 20 μm) was obtained in the same manner as in Example 1 except that alumina containing 45 mass % of particles having particle diameters of 10 to 20 μm was used as an aluminum source material, and alumina particles, titanium oxide particles and silica particles were blended so that amounts of an aluminum component, a titanium component and a silicon component indicated ratios shown in Table 1 in terms of $Al_2O_3$, $TiO_2$ and $SiO_2$, respectively.

The open porosity, average pore diameters and gas permeability coefficients of the fired honeycomb bodies obtained in the Examples and the Comparative Examples were measured by the following methods. The results are shown in Table 1.

Open Porosity:

Using the Archimedes process by immersion in water, an in-water weight (M2g), a saturated water weight (M3g) and a dry weight (M1g) were measured by a method in conformity to JIS R1634, and the open porosity was calculated by the following equation:

Open porosity (%)=100×(M3−M1)/(M3−M2)

Average Pore Diameter:

The average pore diameter was measured using a mercury porosimeter (Pore Master-60-GT manufactured by QUANTACHROME Co.) by mercury porosimetry.

Figure 2:
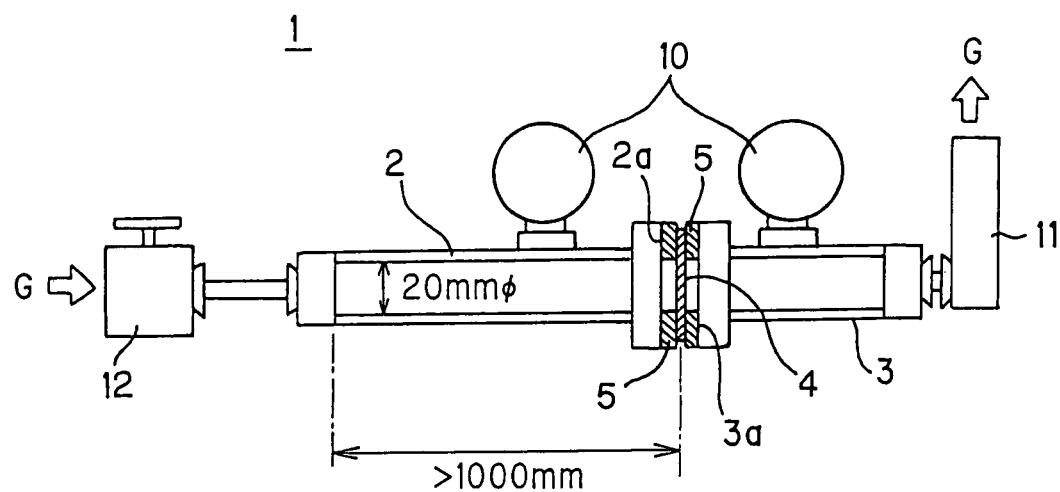
FIG. 2 is a schematic front view showing gas permeability measuring device.

Gas Permeability Coefficient:

The coefficient was calculated by the following measuring method and calculating method based on the Darcy rule in consideration of compressibility of a gas. That is, a part of partition walls was taken from each porous body having the honeycomb structure, and polished so as to eliminate concave and convex portions, thereby preparing a measurement sample having a flat-plate portion. In a gas permeability measuring device 1 shown in FIG. 2, between opening end portions 2a and 3a of two cylindrical tubes 2 and 3 each having an inner diameter of 20 mm, the flat-plate portion of this measurement sample 4 was sandwiched between sealing materials 5 so that there was not any gas leakage, and inner diameter portion shapes of the cylindrical tubes 2, 3 between which the measurement sample was sandwiched overlap on opposite sides of the measurement sample 4. Thereafter, atmospheric air (gas G) having its flow rate controlled was allowed to pass from one cylindrical tube 2. At this time, pressures on upstream and downstream sides of the measurement sample 4 were measured, respectively, and a gas permeability coefficient K (μm²) was calculated based on the following equation (1). In FIG. 2, reference numeral 10 denotes an absolute pressure meter, reference numeral 11 denotes a flow rate meter, and reference numeral 12 denotes a flow rate control valve.

$$K = \frac{8\mu TQP_2}{\pi D^2(P_1^2 - P_2^2)} \times 10^{12}, \tag{1}$$

wherein Q denotes a passed gas flow rate (m³/s) measured on the downstream side of the measurement sample, T denotes a thickness (m) of the flat-plate portion of the measurement sample, μ denotes a passed gas static viscosity coefficient (Pa·s), D denotes a diameter (m) of a gas passing portion of the measurement sample, $P_1$ denotes a gas pressure (Pa) on the upstream side, $P_2$ denotes a gas pressure (Pa) on the downstream side, and π denotes a circle ratio.

TABLE 1

| | Alumina particles | Amount of alumina particles to be added to fired body mass [mass %] | Component ratio in fired body [mass %] | | | Open porosity [%] | Average pore diameter [μm] | Gas permeability coefficient [m²] |
|---|---|---|---|---|---|---|---|---|
| | | | $Al_2O_3$ | $TiO_2$ | $SiO_2$ | | | |
| Example 1 | A[*1] | 54.2 | 54.2 | 42.5 | 3.3 | 55 | 15 | 2.2 |
| Example 2 | A[*1] | 50.7 | 50.7 | 43.6 | 5.7 | 55 | 15 | 2 |
| Example 3 | B[*2] | 50.7 | 50.7 | 43.6 | 5.7 | 55 | 15 | 1.8 |
| Example 4[*4] | B[*2] | 50 | 54.2 | 42.5 | 3.3 | 55 | 14 | 1.6 |
| Comparative Example 1 | B[*2] | 45 | 45 | 50 | 5 | 54 | 14 | 1 |
| Comparative Example 2 | C[*3] | 50.7 | 50.7 | 43.6 | 5.7 | 55 | 14 | 1 |

[*1] Alumina particles A: alumina particles containing 70 mass % of particles having particle diameters of 10 to 20 μm
[*2] Alumina particles B: alumina particles containing 50 mass % of particles having particle diameters of 10 to 20 μm
[*3] Alumina particles B: alumina particles containing 45 mass % of particles having particle diameters of 10 to 20 μm
[*4] Mullite added It has been confirmed from Table 1 that in the fired honeycomb bodies (porous bodies) obtained in Examples 1 to 4, as compared with the fired honeycomb bodies obtained in Comparative Examples 1 and 2, the gas permeability coefficient was large while having substantially similar open porosity and average pore diameter. Therefore, according to the manufacturing methods of Examples 1 to 4, it was possible to obtain the porous bodies having reduced pressure losses.

In the method of manufacturing a porous body of the present invention, it is possible to manufacture a porous body having a high fluid permeability and a reduced pressure loss, and the method can preferably be used in manufacturing a porous body preferably usable in a filter such as a diesel particulate filter, a catalyst carrier or the like, especially a porous honeycomb structure.

The invention claimed is:

1. A method of manufacturing a porous body, comprising the steps of:
   providing a formed body including an aluminum source material and a titanium source material, wherein 50 mass % or more of particles defining the aluminum source material have particle diameters of 10 to 20 μm; and
   firing the formed body to obtain a fired porous body containing aluminum titanate as a main component;
   wherein an amount of the aluminum source material in the formed body is set so that an amount of an aluminum component in the fired porous body is 48 mass % or more in terms of $Al_2O_3$.

2. The method of manufacturing the porous body according to claim 1, wherein the aluminum source material comprises aluminum oxide particles.

3. The method of manufacturing the porous body according to claim 2, wherein the titanium source material comprises particles having an average particle diameter of 0.5 to 10 μm.

4. The method of manufacturing the porous body according to claim 3, wherein the formed body further includes a silicon source material; and
   wherein the fired porous body comprises an aluminum titanate and mullite based article.

5. The method of manufacturing the porous body according to claim 4, wherein the titanium source material comprises titanium oxide.

6. The method of manufacturing the porous body according to claim 5, wherein the porous body is a honeycomb structure.

7. The method of manufacturing the porous body according to claim 4, wherein the porous body is a honeycomb structure.

8. The method of manufacturing the porous body according to claim 3, wherein the titanium source material comprises titanium oxide.

9. The method of manufacturing the porous body according to claim 8, wherein the porous body is a honeycomb structure.

10. The method of manufacturing the porous body according to claim 3, wherein the porous body is a honeycomb structure.

11. The method of manufacturing the porous body according to claim 2, wherein the titanium source material comprises titanium oxide.

12. The method of manufacturing the porous body according to claim 2, wherein the porous body is a honeycomb structure.

13. The method of manufacturing the porous body according to claim 1, wherein the titanium source material comprises particles having an average particle diameter of 0.5 to 10 μm.

14. The method of manufacturing the porous body according to claim 1, wherein the formed body further includes a silicon source material; and
   wherein the fired porous body comprises an aluminum titanate and mullite based article.

15. The method of manufacturing the porous body according to claim 1, wherein the titanium source material comprises titanium oxide.

16. The method of manufacturing the porous body according to claim 1, wherein the porous body is a honeycomb structure.

17. The method of manufacturing the porous body according to claim 1, wherein during the firing step, the aluminum source material forms aggregates whereby aluminum titanate is formed as the titanium source material is mixed into the aluminum source material.

* * * * *